M. HALLINBECK.
Harvester.
No. 27,901.
Patented April 17, 1860.
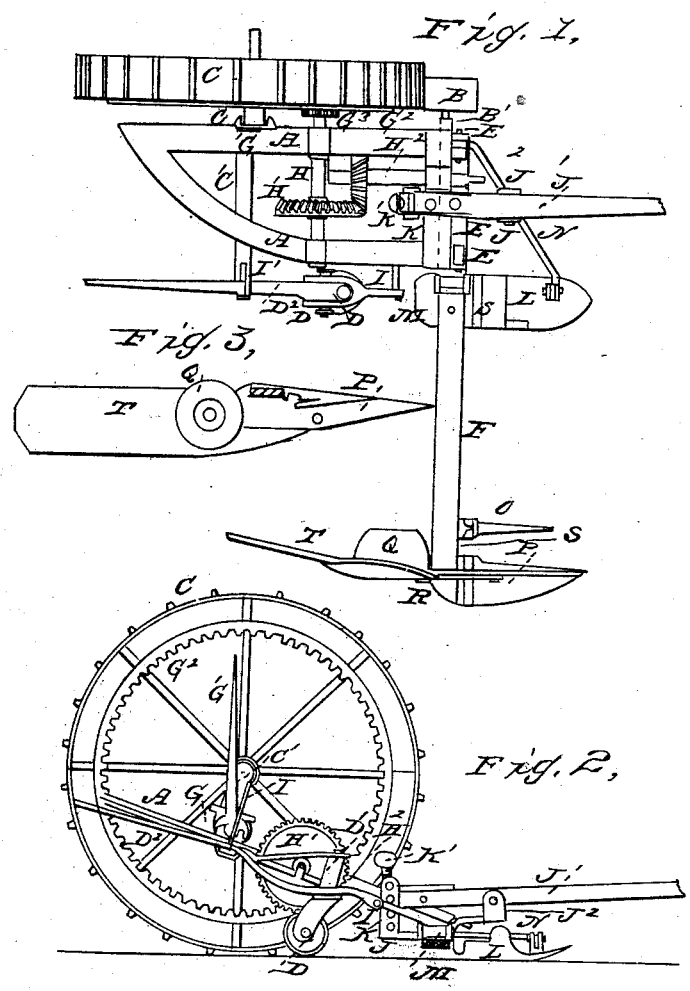
Witnesses:
Inventor:
Martin Hallinbeck

UNITED STATES PATENT OFFICE.

MARTIN HALLENBECK, OF ALBANY, NEW YORK.

IMPROVEMENT IN HARVESTING-MACHINES.

Specification forming part of Letters Patent No. 27,901, dated April 17, 1860.

REISSUED

*To all whom it may concern:*

Be it known that I, MARTIN HALLENBECK, of the city and county of Albany, and State of New York, have invented certain new and useful Improvements in Harvesters for Grain, Grass, &c.; and I do hereby declare that the same are described and represented in the following specification and drawings.

To enable others skilled in the art to make and use my improvements, I will proceed to describe their construction and operation, referring to the drawings, in which the same letters indicate like parts in each of the figures.

Figure 1 is a plan of such parts of a harvester as are required to show my improvements. Fig. 2 is an elevation; and Fig. 3 is an elevation of the divider, track-clearer, and supporting-wheel.

The nature of my invention and improvements in harvesters consists in a bent or crank-shaped axle arranged to vibrate so as to release and connect the gearing that operates the cutting apparatus; and the construction and arrangement of the tongue and main frame, in combination with the shank of the finger-bar, hinged to the finger-bar and main frame.

In the accompanying drawings, A A are the sides, and A' the front end, of the carriage, made in the form shown in the drawings. This carriage is supported by three wheels, B, C, and D. The shank E of the sickle-bar F is hung to the ends of the sides A A by the hinges E' E', so as to be partly under the front A', and the axle B' of the wheel B is fastened to the shank E and bent up, like a crank, so as to carry the shank E close to the ground. The axle C' of the driving-wheel C is also made in the form of a crank and fastened to the under side of the sides A A, so as to vibrate freely; and the stand G is fastened to the side A, and has two lugs on it, as shown in Fig. 1, to prevent the axle C from vibrating more than a given distance. To vibrate this axle and release or put the cutting apparatus in motion, the lever G' is fastened to the stand G, and has two lugs projecting through slots in the stand, one on each side of the axle, so that by vibrating the lever the axle is vibrated and the gear $G^2$ is carried to or from the pinion $G^3$, so as to put it in gear to set the cutting apparatus in motion or throw it out of gear to stop it. The shaft H of the pinion $G^3$ turns in boxes fastened to the sides A A, and carries the bevel-gear H' and turns the pinion and crank-shaft $H^2$, which shaft turns in boxes fastened to the side A and to the front end, A', and may have a crank applied to it to operate the cutter-bar by a connecting-link in the usual manner.

D is a caster-wheel, which turns on an axle in the arms of the pivot D', which pivot turns in the branched lever $D^2$, which vibrates on the pivot I, fastened to the side A, as shown in the drawings, and is arranged to traverse in the staple I', fastened in the axle C', which staple has a notch in it, which is next to the axle C', so that when the lever is pressed down to the axle and thrown into the notch in the position shown in Fig. 2 it raises the sickle-bar some distance from the ground, so as to cut the grain high and leave the stubble long, or pass over stones, stumps, or other obstructions in the path of the machine; and there may be a series of notches in the side of the staple, into which the lever may be placed, so as to hold or carry the sickle-bar at the desired height; or the lever may be allowed to go to the top of the staple and let the cutter-bar drag on the ground. The upper end of the pivot D' inclines forward, as shown in the drawings, so as to carry the fore end of the frame and sickle-bar low when the machine is drawn forward in cutting grass or grain; but if the machine is pushed backward the caster-wheel D immediately swings around, and in doing so lifts or raises the cutter-bar clear of the ground, and raises it so far from the ground, in consequence of the inclination of the pivot D', as to prevent it catching into the ground, so as to stop the machine from running back or break it.

The stand J is made in the form represented in the drawings and fastened to the top of the shank E of the cutter-bar, and the pole J' is hinged in this stand by the pin $J^2$, so as to vibrate freely as the horses which draw the machine pass over uneven ground, which horses may be harnessed to the pole J' in some convenient manner. The standards K project up from the rear end of the stand J, and they are provided with a series of holes, through which a pin may be put to prevent the rear end of the pole from rising higher than the point at which the pin limits it; and the screw K' passes through the rear end of the pole J', and may be screwed so as to prevent the rear end of the tongue or pole from going too low; or it may be screwed down against the stand J, so as to raise the end of the pole against the pin in the standards K and prevent it from vibrating at all.

The shoe L is made in the form represented and hinged to the shank E of the cutter-bar, as shown at M, and the forward end of the shoe is hinged to the brace N from the opposite end of the shank E, so that the shoe L and sickle-bar F may be turned up so as to bring the latter over the shank E when moving the machine from one place to another. The sickle-bar E is fastened to the shoe L, and may be provided with guard-fingers, like the one shown at O, or such others as may be preferred.

The divider P is made in the form shown in the drawings, so as to serve as a shoe for the outer end of the sickle-bar, and the upright part of it extends back behind the bar, and has a pivot fastened in it for the hemispherical wheel Q to turn on, which carries the outer end of the bar F, and is made hemispherical, so as to shed the grass or grain that falls on or against it, and the edge of the track-clearer extends over the edge of the wheel, so as to prevent the grass or grain cut from catching between the shoe and the wheel, or between the track-clearer T and the wheel. The fore end of the track-clearer T is hinged to the upright part of the shoe, so as to vibrate freely by the side of it, and is held against the side of said upright part by the standard R on the divider P. The scores (shown at S S) in the shoes and fingers are designed for the cutter-bar to traverse in.

With my improvements the cutter-bar may be raised by the lever $D^2$ without throwing the weight on the necks of the horses which draw it; besides, when the machine is pushed back the sickle-bar is raised by the caster-wheel; and, further, by hinging the shank of sickle-bar to the end of the frame the machine will cut closer to the ground where it is uneven and save more of the crop.

I believe I have described and represented my improvements in harvesters so as to enable any person skilled in the art to make and use them. I will now state what I desire to secure by Letters Patent—to wit:

1. The arrangement of the bent or crank-shaped axle C' to vibrate substantially as described, to release and connect the gearing, as described.

2. The construction and arrangement of the tongue and main frame, in combination with the shank of the finger-bar, hinged to the finger-bar and main frame, in the manner and for the purpose specified.

MARTIN HALLENBECK.

Witnesses:
J. DENNIS, Jr.,
J. F. CALLAN.